Figure 4:
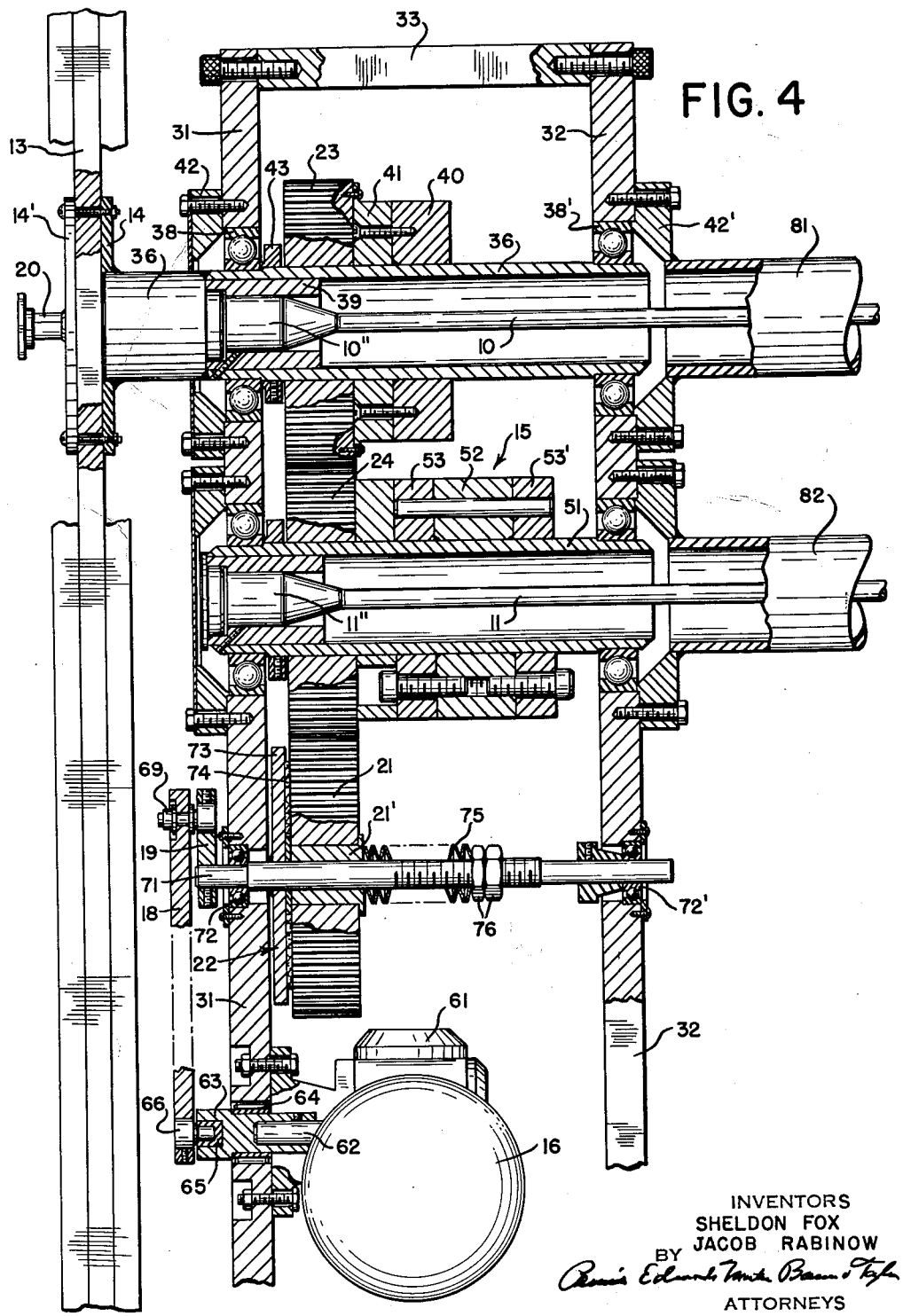

March 24, 1964    S. FOX ET AL    3,125,888
RESONANT OSCILLATING ANTENNA DRIVE
Filed March 22, 1962    3 Sheets-Sheet 1
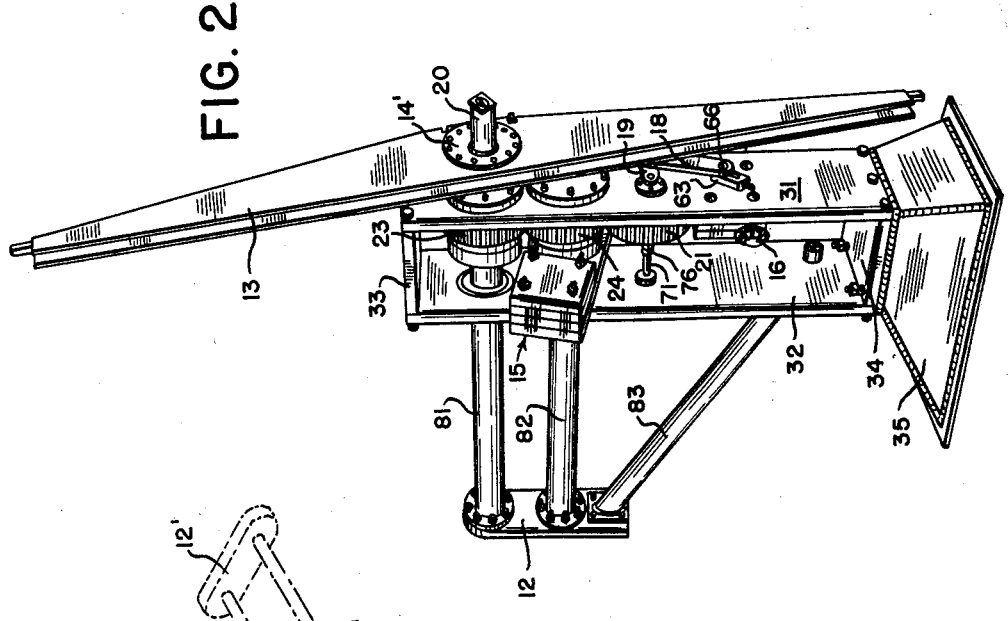
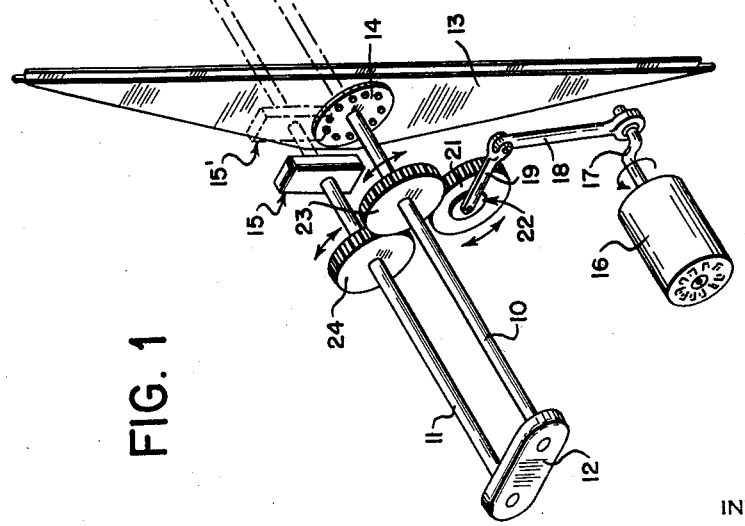
INVENTORS
SHELDON FOX
BY JACOB RABINOW
ATTORNEYS

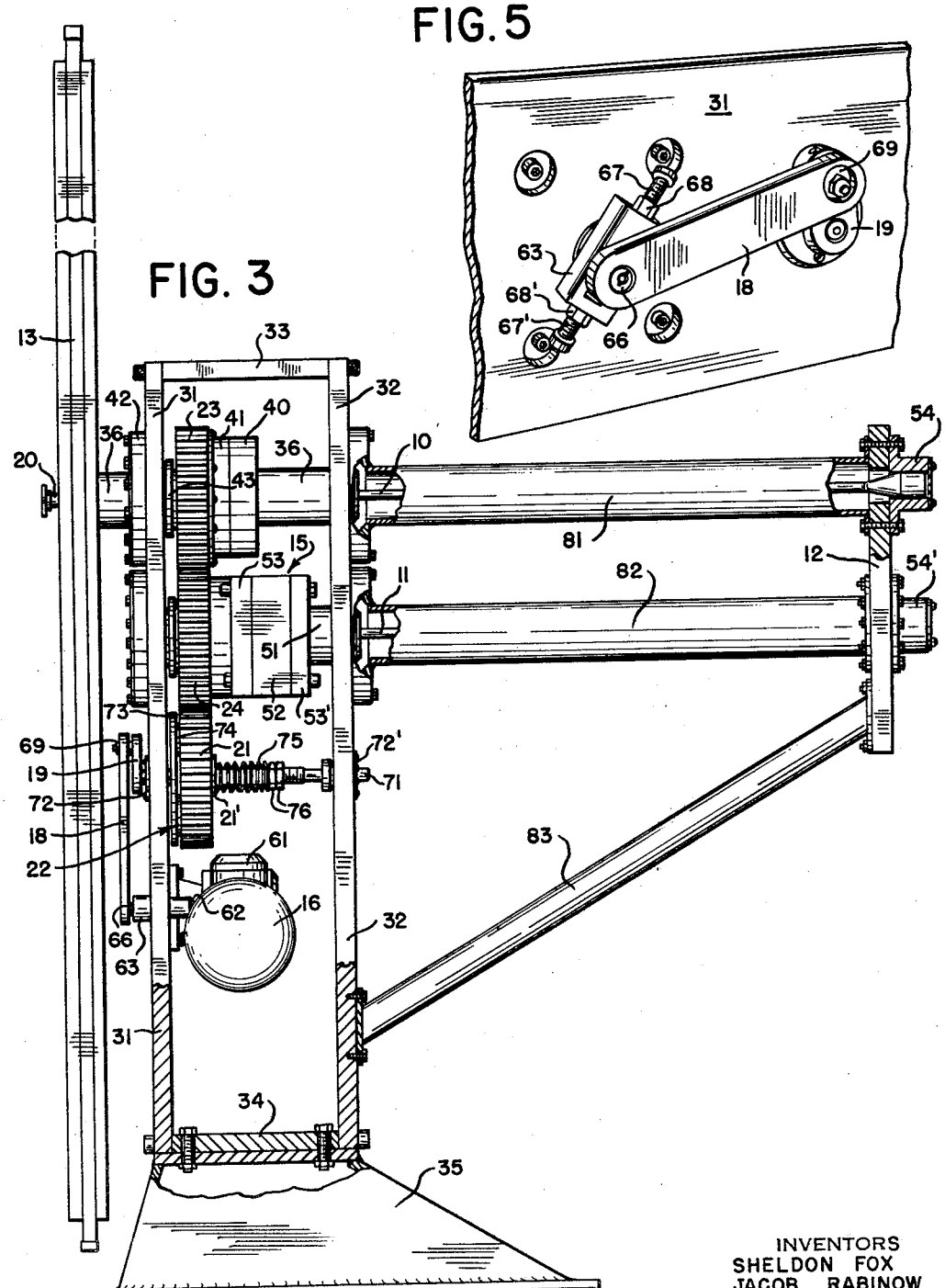

March 24, 1964 S. FOX ET AL 3,125,888
RESONANT OSCILLATING ANTENNA DRIVE
Filed March 22, 1962 3 Sheets-Sheet 3

INVENTORS
SHELDON FOX
JACOB RABINOW
BY
ATTORNEYS

United States Patent Office 3,125,888
Patented Mar. 24, 1964

3,125,888
RESONANT OSCILLATING ANTENNA DRIVE
Sheldon Fox, Cold Spring Harbor, N.Y., and Jacob Rabinow, Rockville, Md., assignor to Cutler-Hammer, Inc., Milwaukee, Wis., a corporation of Delaware
Filed Mar. 22, 1962, Ser. No. 181,568
7 Claims. (Cl. 74—98)

This invention relates generally to means for driving an oscillating member, and specifically to an improved antenna drive.

Oscillating antennas are frequently used in radio-frequency systems for producing a scanning beam in transmission, or to receive radio frequency energy selectively from progressively different directions. Among these are scanning beam radar systems and aircraft instrument navigation or landing systems. In some applications, relatively large antennas must be oscillated through a considerable angle, and at a relatively high frequency considering the size of the structure.

The antenna drive mechanism of the present invention was particularly designed for use in an aircraft instrument landing system of the type disclosed, for example, in U.S. application Serial No. 27,406, filed May 6, 1960 by Battle and Tatz. For this particular application it was desired to oscillate an 8-foot antenna through a 30° angle at five complete cycles per second. A constant amplitude of oscillation and a constant frequency of oscillation were desired, together with freedom from vibration and high reliability under long periods of use.

Various means for effecting the oscillation of antennas are known, some of which employ spring return mechanisms which cooperate with a driving source of power to cause oscillation of the antenna at a desired frequency. Some of the known structures require relatively massive structural members to provide adequate strength, particularly at high operating frequencies, and are deficient in one or more of the foregoing respects.

The present invention provides an oscillating antenna drive mechanism which meets the foregoing requirements with a relatively simple structure capable of long periods of operation without undue wear and maintenance. Further, relatively large antennas may be oscillated at comparatively high frequencies without unduly massive members and with a low power driving source.

In accordance with the invention, a mechanically resonant system is provided utilizing torsionally resilient members coupling the antenna and a counterweight for oscillation in opposite directions, and the system is driven in such a manner as to produce a constant amplitude of oscillation in normal operation.

In the specific embodiment described hereinafter, a pair of parallel torsion bars are employed, with the antenna and counterweight attached at adjacent ends of the torsion bars and the other ends of the torsion bars connected together by a coupling plate. The torsion bars and their associated masses are tuned to resonate at the same frequency, so that in operation the coupling plate is at a node. This, together with the counter-oscillating antenna and counterweight, yields an overall structure markedly free of vibration.

The antenna is oscillated approximately sinusoidally at its resonant frequency by driving means including a slipping member which allows starting the antenna without producing large stresses and without requiring a large driving source. The slipping member is adjusted so that in normal operation there is no slippage, thereby assuring a constant amplitude of oscillation. Advantageously the antenna and counterweight are geared or otherwise coupled together for rotation in opposite directions, thereby permitting the antenna to be brought up to operating amplitude of oscillation in a short time without producing undue stresses in the mechanism, and also insuring proper operation in case of slight mistuning of the resonant structure.

The invention will be described in connection with a specific embodiment thereof illustrated in the accompanying drawings in which:

FIG. 1 illustrates certain principles of the invention; and
FIGS. 2–5 illustrate a specific embodiment of the invention.

Referring to FIG. 1, a pair of torsion bars 10 and 11 are fixedly attached at adjacent ends thereof to coupling plate 12. At the other end of torsion bar 10 an antenna 13 is fixedly attached by a mounting plate 14. At the adjacent end of torsion bar 11 a counterweight 15 is fixedly attached. Suitable bearings are provided for rotationally supporting the antenna 13 and counterweight 15, and will be described in connection with the specific embodiment.

The antenna is fed through a waveguide coupling section 20, and is designed to transmit a fan-shaped beam which is narrow in the plane of rotation of the antenna. Since the specific construction of the antenna forms no part of the present invention, further description is unnecessary.

The moments of inertia of the antenna 13 and counterweight 15, and the spring constants of the torsion bars, are selected to provide a resonant system in which the antenna and counterweight oscillate in opposite directions, that is, when the antenna is moving clockwise the counterweight is moving counterclockwise, and vice versa.

In general, this may be accomplished by considering coupling plate 12 to be a member fixed with respect to ground, and designing each torsion bar and its associated mass to resonate at the same frequency in accordance with the equation:

$$f_r = \frac{1}{2\pi}\sqrt{\frac{K}{I}} \qquad (1)$$

where $f_r$ = resonant frequency
$K$ = torsional spring constant in, say, inch-pounds per degree of twisting
$I$ = moment of inertia of the associated mass.

In FIG. 1 this is accomplished by making the torsion bars 10 and 11 of equal length, and of the same diameter and material, and the moments of inertia of the antenna 13 and counterweight 15 the same.

When this is done, coupling plate 12 is at a node in the resonant system, and there is little if any movement or vibration thereof. Further, it is unnecessary to make the plate 12 fixed with respect to ground insofar as the resonant oscillation is concerned. This avoids the need for massive structures for the purpose. However, inasmuch as the plate 12 is subjected to considerable stress in coupling energy from one torsion bar system to the other, the plate itself should be made adequately strong to avoid fracture.

Motor 16 provides the driving power and has a crank 17 connected through link 18 to a crank arm 19. The latter is connected to a gear 21 through a slip clutch 22. Gear 21 meshes with gear 23 arranged to oscillate the antenna 13, and gear 23 in turn meshes with gear 24 arranged to oscillate the counterweight 15. With a small throw of crank 17, and a relatively long link 18, continuous rotation of crank 17 produces substantially sinusoidal oscillation of crank arm 19. The motor speed and resonant frequency are correlated so that the oscillation of arm 19 is at the resonant frequency.

Slip clutch 22 is adjusted so that there is substantially no slippage when the antenna is oscillating at resonant frequency and full amplitude. Inasmuch as the losses in torsion bars 10 and 11 are low, only a comparatively small power is required to drive the antenna, once the operating amplitude is reached. However, in starting up the antenna, clutch 22 will slip and initially only small angular excursions of gear 21 will be produced. As power continues to be applied, the antenna oscillation amplitude will gradually increase until it corresponds to that of crank arm 19, whereupon slippage will cease and the antenna oscillation will have a fixed amplitude equal to the amplitude of oscillation of crank arm 19 (assuming that gears 21 and 23 are of the same size).

In starting up, with the antenna oscillation amplitude gradually increasing, the natural operation of the resonant system including torsion bars 10 and 11 would not insure a 180° phase relationship between the rotations of the antenna and the counterweight due to lag in the transmission of torque to the counterweight. Thus in starting up, coupling plate 12 would not be at a node and large unbalanced forces could be present at the plate. This would result in considerable strain and vibration, particularly if the antenna is brought up to operating amplitude in a short time. Consequently, gear 24 is provided in mesh with gear 23 so that at all times the torques on the antenna and counterweight are in opposite directions.

Once full operating amplitude is reached, gear 24 would be unnecessary if the antenna and its torsion bar are tuned precisely to the same frequency as the counterweight and its torsion bar. However, if precise tuning is not obtained, or there is some variation in operation, the meshing of gears 23 and 24 insures equal and opposite directions of rotation of antenna and counterweight. In practice, sufficiently close tuning may be maintained so that only small torques need be transmitted by the meshing of gears 23 and 24.

FIG. 1 includes members 10', 11', 12' and 15' illustrated in phantom. These are, in effect, mirror extensions of the torsion bar and counterweight structure previously described. This arrangement may be utilized where the torsion bars are of the pre-stressed type, wherein the pre-set twist of bar 10 is opposed by an opposite twist of 10', to give a neutral position of the antenna with equal and opposite stresses for given angular movements in opposite directions. It is preferred, however, to employ torsion bars which are not pre-stressed and use the single-ended arrangement.

Referring now to FIGS. 2–5, a detailed structure is shown of the single-ended arrangement described in connection with FIG. 1. Slight rearrangements of the elements shown in FIG. 1 have been made for convenience, but the principles of operation are the same.

A rectangular frame is provided by side plates 31, 32 and top and bottom plates 33, 34, bolted together as indicated. The bottom plate is in turn bolted to a base 35. The antenna 13 is bolted to plate 14 and the latter forms part of a hub assembly 36. Hub assembly 36 is rotatably mounted in side plates 31, 32 by bearings 38, 38'. Torsion rod 10 is provided with an enlarged end 10" which is rigidly attached to a sleeve 39 which, in turn, is fixedly attached to the inside of hub 36. Consequently, the moment of inertia of the antenna and hub assembly is effective on torsion bar 10 at the enlarged end 10" thereof.

A collar 40 is affixed to hub 36 by welding or otherwise, and gear 23 bolted thereto with the aid of a spacer 41. The hub assembly is retained in proper longitudinal position by an end plate 42 bolted to frame plate 31, and a collar 43 affixed to hub 36 by a set screw.

The counterweight 15 is affixed to hub assembly 51. As shown, one member 52 of the counterweight is attached to hub 51 by welding or otherwise, and additional members 53, 53' are bolted thereto. This permits convenient adjustment of the exact mass of the counterweight. Hub 51 is mounted in side plates 31, 32 in the manner described for hub 36 and this description need not be repeated. Gear 24 is fixedly mounted on hub 51 by attachment to the counterweight.

Torsion bar 11 is provided with an enlarged end 11" and rigidly attached to the inside of the hub 51 in the same manner as that described for torsion bar 10. It will be noted that the amount of inertia of the counterweight 15 is effective at the enlarged end 11" of the torsion bar, which is in vertical alignment with the enlarged end 10" at which the antenna moment of inertia is effective. The outer ends of the torsion bars are enlarged and rigidly affixed to plate 12 by mounting members 54, 54' (FIG. 3). Thus, the effective lengths of the two torsion bars 10 and 11 are the same.

Motor 16 is connected to a reduction gear box 61 so as to obtain a suitable speed of rotation of shaft 62, and the assembly bolted to frame plate 31. A crank member 63 is attached to shaft 62 by a set screw as shown, and is journalled by roller bearings 64 in frame plate 31.

In this embodiment only a small throw of the crank is required. For this reason, and also to permit convenient adjustment, the crank is formed by a slide member 65 (FIG. 4) slidable in member 63 and carrying a bearing stud 66 which is eccentric to shaft 62. Slide 65 is held in the desired position in member 63 by the adjusting screws 67, 67' and lock nuts 68, 68'. Link 18 is pivotally mounted on stud 66 and the upper end is pivotally attached at 69 to lever arm 19. The other end of the lever arm is fixedly attached to a shaft 71 mounted by bearings 72, 72' in the frame plates 31, 32.

The eccentricity of stud 66 is adjusted to produce the desired normal amplitude of oscillation of the antenna. In this embodiment the dimensions of the drive components are selected to produce a 30° (±15°) excursion.

Clutch plate 73 is fixedly attached to shaft 71, as by welding, etc. A suitable friction disc 74 is attached to a cooperating face of gear 21. The latter has a hub 21' affixed thereto which is free to rotate on shaft 71 except as restrained by the clutch. Gear 21 is spring-biased toward the clutch plate by spring 75, and the compressional force is adjustable by lock nuts 76.

Motor 16 may be of any suitable type for the purpose. To facilitate exact matching of the drive frequency with the resonant frequency of the antenna structure, a variable speed motor or a variable speed transmission between motor and shaft 62 may be employed. With steel torsion bars, the losses in the resonant antenna-counterweight structure are very small, so that only a small amount of power is required in normal operation. Also, the low losses result in a high mechanical "Q" (ratio of mechanical reactance to loss, by analogy to electronic circuit terminology) of the resonant structure. Thus, if the motor is of a type in which the torque varies with speed over a suitable range, the driving speed will tend to be pulled to the resonant frequency of the antenna structure.

The outer ends of the torsion bars and plate 12 are supported by tubular members 81, 82 which have flanges at each end bolted to the frame member 32 and plate 12, respectively. Strut 83 is also bolted to member 32 and plate 12. This support structure holds the torsion bars in parallel alignment and perpendicular to the plane of rotation of antenna and counterweight, and also provides protection against damage.

It will be understood that the overall moment of inertia of the antenna, hub assembly 36, and gear mounting assembly 23, 40, 41, will enter into determining the resonant frequency with the spring constant of torsion bar 10. Similarly, the overall moment of inertia of the counterweight 15, gear 24 and hub assembly 51 will be taken into account in determining the resonant frequency with the torsion bar 11. Slight adjustment of the masses associated with the torsion bars may be made to obtain an exact matching of individual resonant frequencies.

Various modifications may be made in the specific embodiment shown, within the spirit and scope of the invention. For example, the torsion bars may be placed in either vertical alignment, as in FIG. 2, or in horizontal alignment, as in FIG. 1. The driving force may be applied to either the antenna or counterweight if the two are direct-coupled by gears, etc. Otherwise, it is preferred to apply the driving force to the antenna. The counterweight orientation about its axis of rotation may be selected as desired.

The crank and lever driving mechanism shown is simple and has been found satisfactory in practice. However, other types of drives may be employed if desired. Also, similar gears have been employed at 21, 23 and 24, for simplicity and convenience in design and operation. However, other gear ratios may be employed, if desired, with suitable change in the resonant structure, driving amplitude and frequency, etc., as required, as will be understood by those skilled in the art.

As above stated, the slip clutch is adjusted so that, at normal operating amplitude of oscillation, there is no slippage. While the friction disc and spring-biasing arrangement shown has been found satisfactory, if desired the clutch may be arranged so that, once operating amplitude has been reached, additional friction is introduced to prevent slippage. This may be accomplished by the use of magnetic clutches, etc., as will be understood by those skilled in the art.

In the embodiment shown, the antenna oscillates in a vertical plane and causes the transmitted beam to scan in a vertical direction. If a horizontally scanning beam is desired, the supporting frame can be modified accordingly so that the torsion bars extend vertically.

We claim:

1. An oscillating antenna drive comprising
   (a) an antenna structure and a counterweight structure mounted for rotational oscillation of antenna and counterweight in substantially parallel planes,
   (b) a pair of generally parallel torsionally resilient members fixedly secured to the antenna and counterweight structures respectively,
   (c) a coupling member fixedly secured to the pair of torsionally resilient members at the ends thereof away from the antenna and counterweight structures,
   (d) the moments of inertia of the antenna and counterweight structures and the resilience of the torsional members being predetermined to establish a resonant frequency of oscillation with the antenna and counterweight structures oscillating in counter directions and the coupling member at substantially a node,
   (e) and driving means coupled to at least one of the antenna and counterweight structures for oscillating the antenna substantially at said resonant frequency.

2. An oscillating antenna drive in accordance with claim 1 in which the driving means includes
   (a) a driving member oscillating with a predetermined amplitude of oscillation and slip clutch means between said driving member and the portion of the antenna and counterweight structure driven thereby,
   (b) the slip clutch means being designed and adapted for transmitting driving forces with substantially no slippage in normal operation but allowing slippage for antenna oscillation amplitudes substantially less than that corresponding to the predetermined oscillation amplitude of the driving member.

3. An oscillating antenna drive in accordance with claim 1 including mechanical means coupling the antenna and counterweight structures for rotational oscillation in counter directions.

4. An oscillating antenna drive in accordance with claim 3 in which the driving means includes
   (a) a driving member oscillating with a predetermined amplitude of oscillation and slip clutch means between said driving member and the portion of the antenna and counterweight structure driven thereby,
   (b) the slip clutch means being designed and adapted for transmitting driving forces with substantially no slippage in normal operation but allowing slippage for antenna oscillation amplitudes substantially less than that corresponding to the predetermined oscillation amplitude of the driving member.

5. An oscillating antenna drive comprising
   (a) a frame,
   (b) an antenna structure and a counterweight structure mounted on said frame for rotational oscillation about substantially parallel axes of rotation,
   (c) a pair of substantially parallel torsion bars fixedly secured to the antenna and counterweight structures respectively and extending along the axes of rotation thereof respectively,
   (d) a coupling plate fixedly secured to the pair of torsion bars at the ends thereof away from the antenna and counterweight structures,
   (e) the moments of inertia of the antenna and counterweight structures and the torsional spring constants of the torsion bars being predetermined to establish a resonant frequency of oscillation with the antenna and counterweight structures oscillating in counter directions and the coupling plate at substantially a node,
   (f) driving means for oscillating the antenna substantially at said resonant frequency,
   (g) said driving means including a driving member oscillating with a predetermined amplitude of oscillation and a slip clutch coupling said driving member with one of said antenna and counterweight structures,
   (h) the slip clutch being designed and adapted for driving said one structure at an oscillation amplitude corresponding to that of said driving member with substantially no slippage in normal operation but allowing slippage for substantially smaller oscillation amplitudes of said one structure.

6. An oscillating antenna drive in accordance with claim 5 including gear means coupling the antenna and counterweight structures for rotational oscillation in counter directions.

7. An oscillating antenna drive in accordance with claim 6 in which the pair of torsion bars have substantially the same length and the antenna and counterweight structures are secured to the torsion bars at substantially the same distance from the coupling plate, respectively.

References Cited in the file of this patent

UNITED STATES PATENTS

| | | |
|---|---|---|
| 2,698,902 | Farrow et al. | Jan. 4, 1955 |
| 2,825,052 | Nichinson et al. | Feb. 25, 1958 |
| 2,877,365 | Dostal | Mar. 10, 1959 |
| 3,058,361 | Freeborn | Oct. 16, 1962 |